US012675475B1

(12) United States Patent
Telugu et al.

(10) Patent No.: US 12,675,475 B1
(45) Date of Patent: Jul. 7, 2026

(54) DATA RETRIEVAL USING QUERY GENERATION MODELS

(71) Applicant: T-Mobile USA, Inc., Bellevue, WA (US)

(72) Inventors: Sreekanth Telugu, Cumming, GA (US); Amina Noor, Sammamish, WA (US); Catherine D. Jackson, Covington, WA (US); Joy Yanyan Tang, Alpharetta, GA (US); Balaji Prasath Balaguru, Cumming, GA (US); Amy Soon Lo, Renton, WA (US); Ramanjaneya Reddy Thirupathi, Sandy Springs, GA (US); Mohammad Mustafa Bari, Woodinville, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 19/192,135

(22) Filed: Apr. 28, 2025

(51) Int. Cl.
 G06F 16/2452    (2019.01)
 G06F 16/242    (2019.01)
 G06F 16/248    (2019.01)

(52) U.S. Cl.
 CPC ...... G06F 16/24522 (2019.01); G06F 16/243 (2019.01); G06F 16/248 (2019.01)

(58) Field of Classification Search
 CPC . G06F 16/24522; G06F 16/248; G06F 16/243
 See application file for complete search history.

(56) References Cited

U.S. PATENT DOCUMENTS

| | | | |
|---|---|---|---|
| 7,831,614 | B2 | 11/2010 | Deffler |
| 9,886,483 | B1 | 2/2018 | Harrison et al. |
| 9,953,059 | B2 | 4/2018 | Deshmukh et al. |
| 9,959,311 | B2 | 5/2018 | Boguraev et al. |
| 10,558,658 | B2 | 2/2020 | Wu et al. |
| 10,706,045 | B1 | 7/2020 | Hasija et al. |
| 11,954,102 | B1 | 4/2024 | Palaniappan et al. |
| 11,966,389 | B2 | 4/2024 | Sheinin et al. |
| 12,130,808 | B2 | 10/2024 | Kim et al. |
| 2006/0041584 | A1 | 2/2006 | Debertin et al. |
| 2016/0188710 | A1 | 6/2016 | Dulba Naik |
| 2017/0161262 | A1 | 6/2017 | Bhatt et al. |
| 2024/0070270 | A1 | 2/2024 | Mace et al. |

(Continued)

FOREIGN PATENT DOCUMENTS

| | | |
|---|---|---|
| CN | 118312531 B | 9/2024 |
| CN | 118696307 A | 9/2024 |
| WO | 2024198725 A1 | 10/2024 |

*Primary Examiner* — Etienne P Leroux
(74) *Attorney, Agent, or Firm* — Perkins Coie LLP

(57) ABSTRACT

Systems, methods, and devices that relate to data retrieval using query generation models are disclosed. In one example aspect, the system receives a natural language request, from a user, for data stored within a database. The system can use a series of specialized large language model (LLM) agents to determine information about where the relevant data is stored within the database and how the data can be retrieved. The system then inputs this information into a query generation LLM, which generates a data retrieval query for retrieving the relevant data from the database. The system executes the query and outputs, to the user, a natural language response that includes the data requested by the user.

20 Claims, 6 Drawing Sheets

(56)  References Cited

U.S. PATENT DOCUMENTS

| | | | |
|---|---|---|---|
| 2024/0144192 A1 | 5/2024 | Weissenberger et al. | |
| 2024/0256588 A1 | 8/2024 | Bischof et al. | |
| 2024/0411798 A1 | 12/2024 | Gerard et al. | |
| 2025/0005018 A1 | 1/2025 | Liu et al. | |
| 2025/0181581 A1* | 6/2025 | Amour ................ | G06F 16/2455 |
| 2025/0193135 A1* | 6/2025 | Sonnenblick .......... | G06N 3/042 |
| 2025/0342312 A1* | 11/2025 | Klafter .................. | G06F 16/953 |
| 2025/0342829 A1* | 11/2025 | Ceffaratti ............... | G16H 10/60 |
| 2025/0370996 A1* | 12/2025 | Kamble ................ | G06F 16/243 |

* cited by examiner

500

502

Receive, via a user device, a request for a data item stored in a data storage location

504

Input, into a first model, the request and a listing of one or more data structures within the data storage location to cause the first model to generate a first output identifying a data structure storing the data item within the data storage location

506

Input, into a second model, the request and a data structure schema of the identified data structure to cause the second model to generate a second output identifying a column of the identified data structure storing the data item within the data structure

508

Input, into a third model, the request and a set of SQL queries to cause the third model to generate a third output identifying a SQL query from the set of SQL queries

510

Input, into a query generation LLM, the first output, the second output, and the third output to cause the query generation LLM to generate a final SQL query to retrieve the data item from the data storage location

512

Execute the final SQL query to cause the retrieval of the data item from the data storage location

514

Output, to the user device, an indication of a retrieved data item

DATA RETRIEVAL USING QUERY GENERATION MODELS

BACKGROUND

Large language models (LLMs) represent a significant advancement in the field of artificial intelligence, particularly in natural language processing (NLP). These models can be designed to generate human-like text based on the input they receive. LLMs can utilize deep learning techniques, specifically neural networks with many layers, to process and generate text. The training process for these models can involve vast amounts of text data, allowing them to learn patterns, context, and nuances in language. As a result, LLMs can perform a wide range of language-related tasks, including translation, summarization, and conversation generation.

NLP is a subfield of artificial intelligence that focuses on the interaction between computers and human language. NLP techniques can enable machines to understand, interpret, and generate human language in a way that is both meaningful and useful. This field can encompass various tasks such as sentiment analysis, named entity recognition, and machine translation. NLP can rely on a combination of linguistic and statistical methods to analyze and model language. The integration of LLMs into NLP can enhance the ability of machines to process and generate text with a higher degree of accuracy and fluency.

Structured Query Language (SQL) is a standardized programming language used for managing and manipulating relational databases. SQL queries can allow users to perform a variety of operations on data stored in databases, such as retrieving specific information, updating records, and deleting data. SQL can be essential for data management in many applications, from small-scale projects to large enterprise systems. The language can be designed to be both powerful and user-friendly, enabling users to perform complex queries with relative ease.

BRIEF DESCRIPTION OF THE DRAWINGS

Detailed descriptions of implementations of the present invention will be described and explained through the use of the accompanying drawings.

FIG. 5 is a flow diagram that illustrates a method of the present technology.

Figure 1:
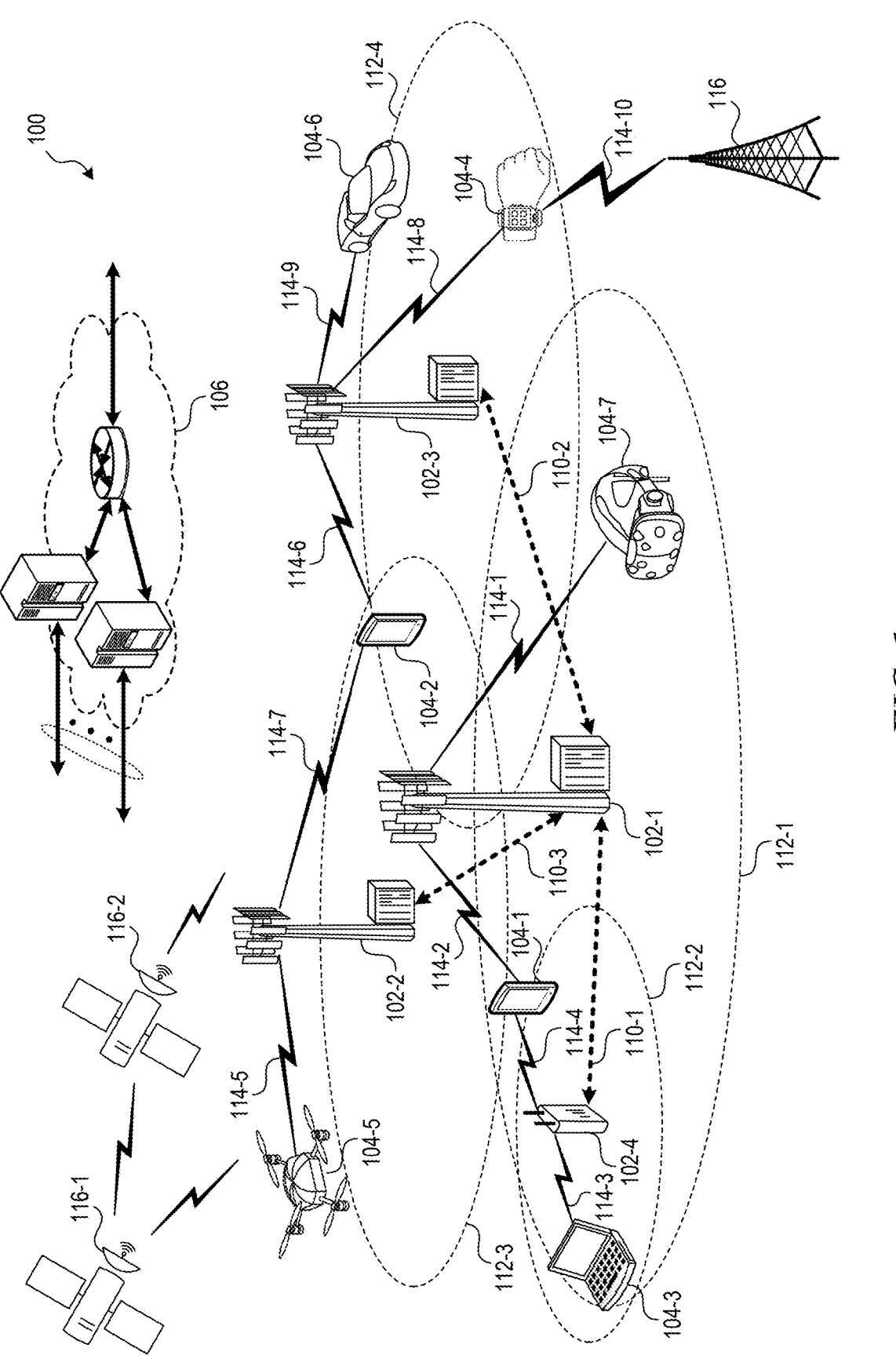
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the realm of data platforms, the sheer volume of data can present significant challenges. These platforms aggregate vast amounts of information from various sources, providing a comprehensive repository of information. However, the process of extracting meaningful insights from this data can be cumbersome and time-consuming. For instance, SQL queries, which are useful for data retrieval and analysis, can require collaboration between different teams to refine and execute. This process can be further complicated by uncertainties regarding which tables to access and the specific SQL queries needed to satisfy particular requests. The complexity of SQL queries can be a significant barrier for many users, particularly those without a technical background. Additionally, the dynamic nature of technical environments means that data needs can change rapidly, requiring frequent updates to the queries. These factors contribute to a cumbersome and inefficient process that can impede the ability to derive timely and actionable insights from the data. Consequently, the challenges surrounding SQL queries can limit the accessibility and effectiveness of these data repositories.

To address these challenges, this document discloses a solution that leverages LLMs to improve the process of querying data platforms. This solution enables users, regardless of familiarity with SQL, to input queries in natural language form. These natural language inputs are then translated into precise SQL statements, which are executed to retrieve the relevant data. This approach not only simplifies the data retrieval process but also enables users to interact with the data platform more effectively. By eliminating the need for specialized SQL knowledge, the system improves accessibility and effectiveness of data retrieval from data repositories.

The architecture of the solution includes several key components designed to enhance user interactions and data retrieval. At its core, the system utilizes advanced LLMs to facilitate NLP, enabling users to engage conversationally with the platform. For example, a user device can receive a natural language input including a request for a data item stored in a database. This input is then fed into a first LLM, along with a listing of one or more tables within the database. The first LLM can generate an output identifying the table storing the data item within the database. This output is then input into a second LLM, along with the table schema of the identified table, to generate a second output identifying the column of the table storing the data item.

The process continues with the natural language input and a set of SQL queries being input into a third LLM. This LLM generates a third output identifying a SQL query from the set of SQL queries, corresponding to the identified table within the database. The first, second, and third outputs are then input into a query generation LLM, which generates a final SQL query to retrieve the data item from the database. This final SQL query is executed to cause the retrieval of the data item, and the system outputs a natural language response to the user device, indicating the retrieved data item. This approach ensures that users can efficiently access data they require without the drawbacks associated with traditional SQL query handling.

By streamlining the process of querying customer data platforms, this solution addresses the inefficiencies and limitations associated with traditional SQL query handling. The use of LLMs and NLP not only enhances the speed and accuracy of data retrieval but also provides a scalable and adaptable solution. Additionally, the integration of advanced language models allows for continuous improvement and adaptation to evolving user requirements, ensuring that the system remains effective over time. This approach thus improves upon methods of accessing data stored in databases, ultimately improving the systems and processes requiring said data.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
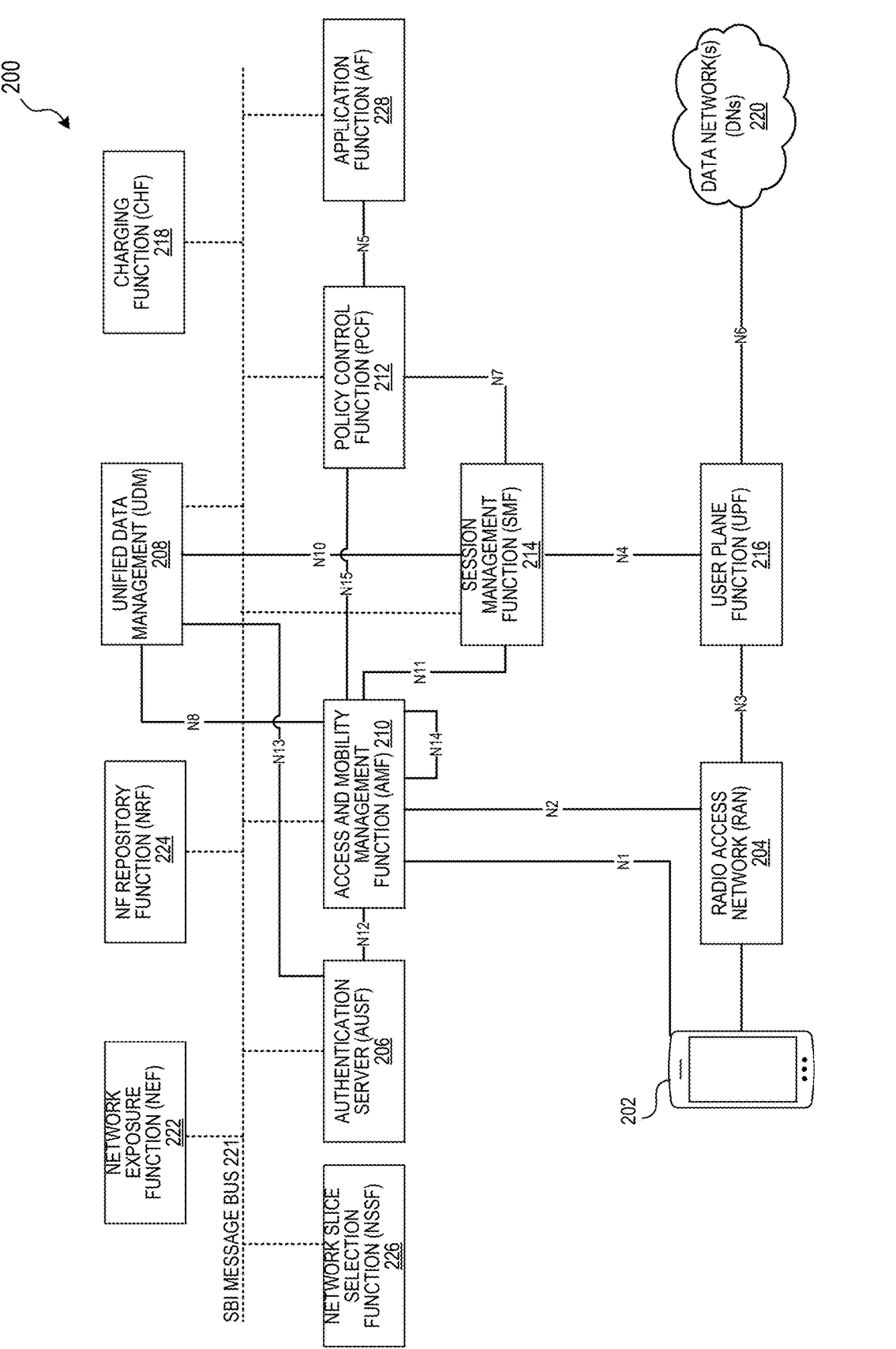
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Data Retrieval Using Query Generation Models

The sheer volume of data stored in data repositories can present significant challenges. These repositories aggregate vast amounts of information from various sources, providing a comprehensive database of information. However, the process of extracting meaningful insights from this data can be cumbersome and time-consuming. For instance, SQL queries, which are useful for data retrieval and analysis, can require technical knowledge and information gathered from various sources in order to refine and execute. This process can be further complicated by uncertainties regarding which tables to access and the specific SQL queries needed to satisfy particular requests. Additionally, the dynamic nature of technical environments means that data needs can change rapidly, requiring frequent updates to the queries. These factors contribute to a cumbersome and ineffective process that can impede the ability to derive timely and actionable insights from the data. Consequently, the challenges surrounding SQL queries can limit the accessibility and effectiveness of these data repositories. The disclosed solution involves leveraging LLMs to improve the process of querying data platforms. This approach enables users, regardless of familiarity with SQL, to input queries in natural language form. These natural language inputs are then translated into precise SQL statements, which are executed to retrieve the relevant data. This method not only simplifies the data retrieval process but also enables users to interact with the data platform more effectively. By eliminating the need for specialized SQL knowledge, the system improves the accessibility and effectiveness of data retrieval from data repositories.

Various types of machine learning models can be employed to streamline and enhance the data retrieval process. These models can be designed to interpret natural language inputs from users and translate them into precise SQL queries. By leveraging advanced NLP techniques, the models can determine the intent behind user queries and identify the relevant tables and columns within the database. This approach can significantly reduce the time and effort required to formulate and execute SQL queries, making the process more efficient and accessible. Additionally, machine learning models can continuously learn and adapt to evolving data needs, ensuring that the system remains effective over time. By integrating these models into the data querying process, organizations can improve the accessibility and effectiveness of their data platforms, enabling users to derive timely and actionable insights with greater ease.

Building on the capabilities of machine learning models, generative models, including both LLMs and small language models (SLMs), can further enhance the data querying process by providing more sophisticated and context-aware responses. Generative models can be employed not only to translate natural language inputs into SQL queries but also to generate comprehensive and nuanced responses based on the retrieved data. These models can ingest complex queries and generate SQL statements that accurately reflect the user's intent, even in cases where the input is ambiguous or incomplete. LLMs are particularly effective at handling a wide range of general language tasks, while SLMs can be tailored to manage more specific or constrained language tasks, ensuring that the queries and responses are highly relevant to the particular field or industry. By leveraging generative models, the system can offer intuitive and conversational interactions, allowing users to engage with the data platform in a natural and seamless manner. Furthermore, these models can provide explanations and insights alongside the retrieved data, helping users to better understand the results and make informed decisions.

In addition to traditional generative models, retrieval-augmented generation (RAG) LLMs can be employed to further enhance the data querying process within the system. RAG LLMs can combine the strengths of generative models with retrieval-based techniques, allowing them to access and incorporate external knowledge sources during the generation process. This approach can significantly improve the accuracy and relevance of the responses generated by the models. When a user submits a query, the RAG LLM can utilize the retrieval techniques to locate pertinent information within a vast database and integrate this information into the generated response. This ensures that the answers provided are not only contextually appropriate but also complete with up-to-date and domain-specific knowledge. Additionally, RAG LLMs can help bridge the gap between static data stored in databases and dynamic, real-time information, making the data querying process more robust and comprehensive.

The data repositories being queried in this system, which can also be referred to as databases or data storage locations, serve as the sources of stored information. These repositories store vast amounts of structured and unstructured data, encompassing various types of information. The integration of advanced querying techniques, including the use of generative models like LLMs and SLMs, enhances the system's capability to extract accurate data and draw meaningful insights from these data repositories. This comprehensive approach to data management and retrieval ensures that accurate and relevant data is retrieved in a way that is accessible to the user requesting the data.

Figure 3:
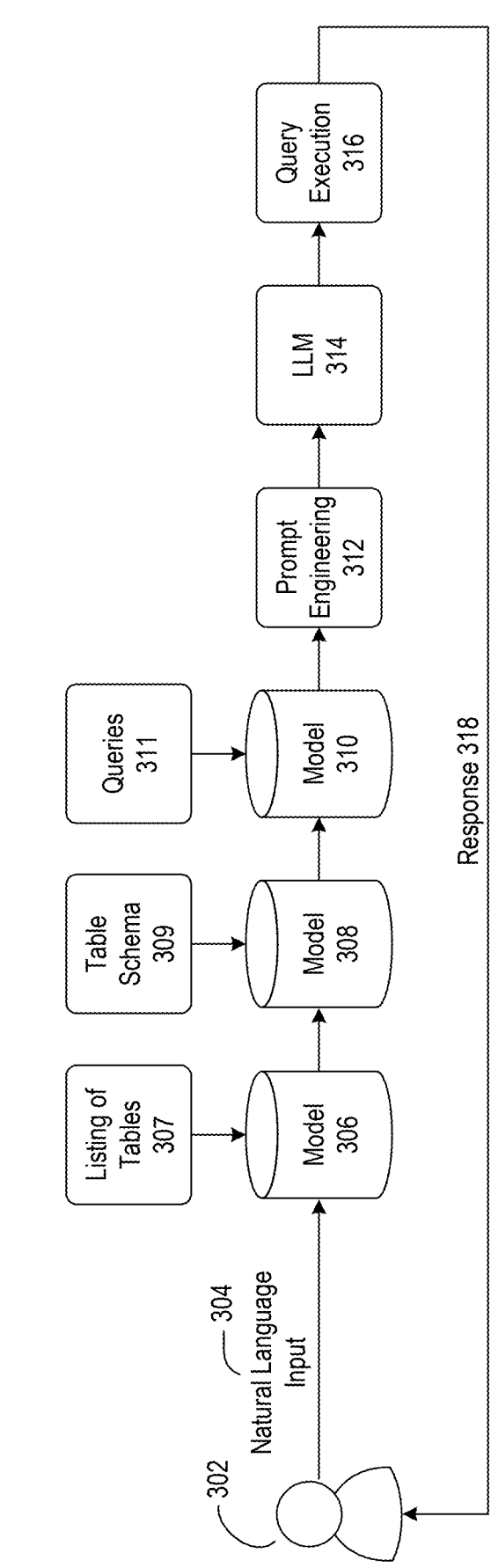
FIG. 3 is a block diagram that illustrates a process of aspects of the present technology.

FIG. 3 is a block diagram 300 that illustrates a process of aspects of the present technology. The block diagram 300 can include a user 302 who submits or inputs a natural language input 304 to the system. In some implementations, the natural language input 304 includes a request for data stored in the database. The block diagram 300 can include a number of models, including a first model 306, a second model 308, and a third model 310. In some implementations, two or more of the first model 306, the second model 308, and the third model 310 are the same model. The natural language input 304 is fed into the first model 306, which also receives as input a listing of tables 307 stored within a database. The first model 306 can output a table, from the listing of tables 307, storing the data requested in the natural language input 304. This output can be fed into the second model 308, which also receives as input a table schema 309 corresponding to the table output by the first model 306. The second model 308 can output a column within the identified table that stores the data item. This output can be fed into the third model 310, which also receives as input queries 311 corresponding to the identified table within the database. For example, the queries 311 can be database queries formatted in a certain language (e.g., SQL). In some implementations, the queries can include pseudocode, XML files that the LLM can interpret to retrieve data, or other types of queries. The third model 310 can output a query from the set of queries 311 that retrieves the data from the identified column of the identified table. The outputs from the three models can be fed into prompt engineering 312 and an LLM 314, which can generate a final SQL query to retrieve the data from the database. Subsequently, the final SQL query can be executed (e.g., query execution 316) and the system can output a response 318 including an indication of the retrieved data. The response 318 can be output to the user 302 or to a user device of the user 302.

In some implementations, the system can receive, via a user device, a request for a data item stored in a database or a data storage location. For example, the system receives, from a user (e.g., the user 302) or via a user device, a natural language input (e.g., the natural language input 304). In some implementations, the natural language input includes a request for a data item stored in a database or a data storage location. The user can utilize a mobile application, a web interface, or a voice-activated assistant to input a request. The user device can feature a text input field where the user can type a query, such as "What are the sales figures for Q1 2025?" The device can have a voice recognition interface that allows the user to speak their request. Upon receiving the natural language input, the system processes the natural language input using multiple models in order to retrieve the data requested in the natural language input. This process enables users to interact with the system intuitively and efficiently, leveraging natural language to access and retrieve data.

In some implementations, the system inputs, into a first model (e.g., the first model 306), the request for data and a listing of one or more data structures (e.g., the listing of tables 307) within the data storage location. For example, the data structures can store the data stored in the data storage location. In some implementations, these inputs cause the first model to generate a first output identifying a data structure storing the data item within the data storage location. The system can input, into a first RAG LLM, the natural language input and a listing of one or more tables within the database. For example, the tables can store the data stored within the database. In some implementations, these inputs can cause the first model to generate a first output identifying a data structure storing the data item within the data storage location. For example, an output from the first model or first RAG LLM identifies a data structure or table storing data within the database or data storage location.

In some implementations, this output is fed into a second model (e.g., the second model 308). For example, the system inputs, into the second model, the request and a data structure schema (e.g., the table schema 309) corresponding to the identified data structure. The data structure schema can indicate an organization, structure, relationships, index, or other information about the identified data structure. In some implementations, this causes the second model to generate a second output identifying a column of the identified data structure storing the data item within the data structure. In some implementations, the system inputs, into a second RAG LLM, the natural language input and a table schema of the identified table. This can cause the second RAG LLM to generate a second output identifying a column of the identified table storing the data item within the table.

In some implementations, this output is fed into a third model (e.g., the third model 310). For example, the system inputs, into the third model, the request and a set of queries (e.g., queries 311). The set of queries can correspond to the identified data structure within the data storage location. For example, the set of queries can correspond to a table within a database in that the queries are specifically designed to retrieve data from that particular table. The queries can be database queries formatted in a certain language (e.g., SQL). In some implementations, the queries can include pseudocode, XML files that the LLM can interpret to retrieve data, or other types of queries. These queries can include SELECT statements that specify the columns to be retrieved, WHERE clauses that define the conditions for data selection, and JOIN operations that link the table with other related tables to gather comprehensive information. By targeting the specific structure and fields of the table, these SQL queries can efficiently extract the required data, ensuring that the retrieval process is both accurate and optimized. Additionally, these queries can incorporate indexing and optimization techniques to enhance performance, making them well-suited for handling large volumes of data within the table.

Inputting the request and the set of SQL queries into the third model can cause the third model to generate a third output identifying a SQL query from the set of SQL queries that can retrieve the data from the identified data structure. In some implementations, the system inputs, into a third RAG LLM, the natural language input and a set of queries. The set of queries can correspond to the identified table within the database. This can cause the third RAG LLM to generate a third output identifying a query from the set of queries that can retrieve the requested data from the identified table within the database.

In some implementations, the set of queries includes pairs of: (i) a particular request for a particular data item within the table and (ii) a corresponding SQL query. For example, each data item can have a corresponding query that can be used to retrieve the data item from a storage location. The set of queries can be stored in these pairs such that the system can perform a lookup of the data item to be retrieved and can find the pair, which includes the corresponding query. This approach can streamline the data retrieval process by allowing the system to quickly identify the appropriate query based on the specific data request.

For example, causing the third RAG LLM to generate the third output identifying the query from the set of queries involves causing the third RAG LLM to utilize the data pairs including the set of queries. For example, the system can identify a first pair for which a first request matches the request of the natural language input. The query can be a first corresponding query included in the first pair. The system can then generate the third output identifying the query.

In some implementations, the system can generate the queries included in the set of queries corresponding to the table and other sets of SQL queries. For example, the system generates, using a query generation model, a corresponding set of queries for each table within the database for retrieval of data items from each table in the database. The system can then convert each query of each corresponding set of queries into a corresponding embedding. For example, the system can use an embedding model to transform each query into a vector representation that captures the semantic meaning of the query. These embeddings can then be stored and indexed, allowing the system to efficiently match and retrieve the appropriate query based on the context of the data request. By converting queries into embeddings, the system can leverage advanced search and retrieval techniques, such as nearest neighbor search, to quickly identify the most relevant query for a given data item.

In some implementations, causing the third RAG LLM to generate the third output identifying the query from the set of queries involves causing the third RAG LLM to identify the query based on an embedding comparison, such as nearest neighbor search. The system can convert the natural language input into an input embedding and search the set of queries for an embedding that is most relevant to the input embedding. For example, the natural language input is processed by a language model to generate a high-dimensional vector representation, or embedding, that captures the semantic content of the input. Next, this input embedding can be compared against the precomputed embeddings using a nearest neighbor search algorithm, which can identify the closest matching embedding based on similarity metrics such as cosine similarity or Euclidean distance. The system can then identify the query corresponding to the embedding.

The system can input the first output, the second output, and the third output into a query generation LLM (e.g., the prompt engineering 312, the LLM 314). This can cause the query generation LLM to generate a final SQL query to retrieve the data item from the database. For example, causing the query generation LLM to generate the final SQL query involves causing the query generation LLM to generate the final SQL query based on the table, the column, and table and column information included in the SQL query. As an illustrative example, if the first output identifies the table "Customers," the second output identifies the column "CustomerName," and the third output provides a base SQL query such as "SELECT*FROM Customers WHERE," the query generation LLM can synthesize these elements to form a final SQL query such as "SELECT CustomerName FROM Customers WHERE [specific conditions]."

In some implementations, the system executes the final SQL query to cause the retrieval of the data item from the database (e.g., the query execution 316). This execution process can involve sending the final SQL query to a database management system (DBMS), which then processes the query to locate and retrieve the specified data item. The DBMS can parse the query, optimize the execution plan, and access the relevant tables and columns to fetch the required data. In some implementations, the system executes the final SQL query, including processing the query to locate and retrieve the specified data item. Once the data item is retrieved, the system can format the data into a user-friendly output, such as a report, dashboard, or direct response to the user's query.

The system can output, to the user device, an indication of a retrieved data item (e.g., the response 318). This output can be presented in various formats depending on the user's preferences and the nature of the data. For instance, the system can display the retrieved data item in a structured table, a detailed report, or a visual representation such as a chart or graph. Additionally, the system can provide contextual information or metadata about the retrieved data item, such as the source table, the query used, and any relevant timestamps. This comprehensive presentation can help users understand the context and significance of the data, facilitating better decision-making and analysis.

The system can output, to the user device, a natural language response (e.g., the response 318) including an indication of the retrieved data item. This natural language response can be generated by leveraging advanced language models that translate the retrieved data into a conversational format that is easy for users to understand. For example, if a user queries the system for the total sales for the previous month, the system can respond with a message like, "The total sales for the previous month were $500,000." This approach can make the interaction more intuitive and user-friendly, especially for individuals who are not familiar with technical data representations. Additionally, the natural language response can include supplementary information or insights, such as trends, comparisons, or recommendations based on the retrieved data. By providing a natural language response, the system can enhance accessibility and usability, ensuring that users can quickly grasp the information they need without having to interpret complex data formats.

The system can output, to the user device, an explanation indicating that the requested data could not be found or accessed if the query generation model is not able to retrieve the correct data. This approach can be employed to prevent the system from hallucinating or generating erroneous data, which could lead to misinformation or incorrect analysis. By providing a clear indication that the data could not be found, the system can maintain a higher level of trust and reliability. This method can also help in identifying gaps in the data or areas where the system's knowledge base needs improvement, ultimately contributing to the system's continuous enhancement and accuracy.

Figure 4:
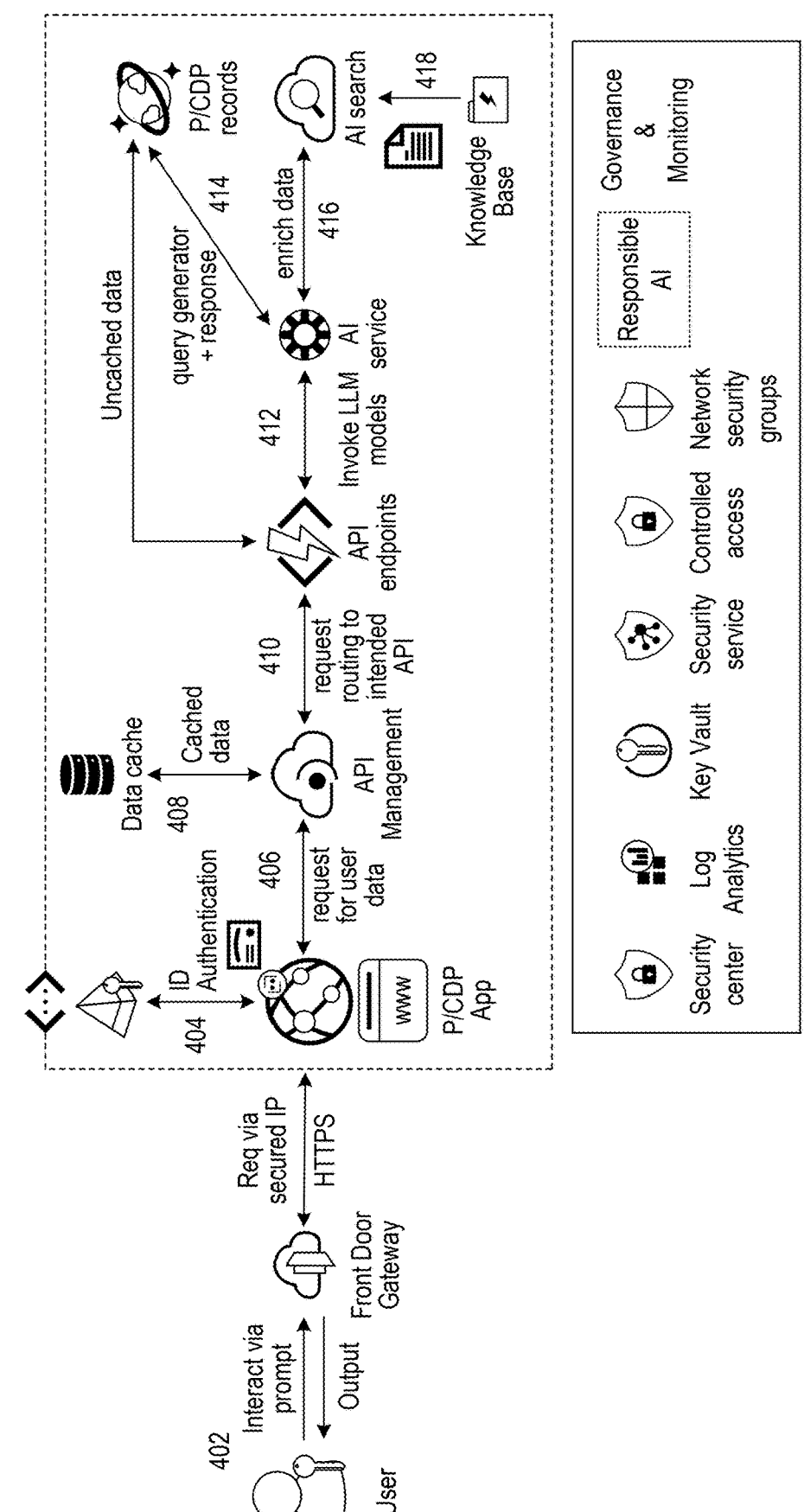
FIG. 4 is a block diagram that illustrates an architecture of aspects of the present technology.

FIG. 4 is a block diagram 400 that illustrates an architecture of aspects of the present technology. The block diagram 400 can represent an illustrative example of the method disclosed herein. As shown in FIG. 4, step 402 can involve a user requesting access to an application via a secured internet protocol (IP) to view data details. For example, the data details can relate to the data requested by the user in the natural language input. Step 404 can involve the user request being authenticated and routed to a home page of the application if authenticated. Step 406 can involve the application accepting the user request to retrieve or access data. For example, once the user is authenticated, the system confirms that the user is authorized to view the specific data requested by the user. At step 408, the system can retrieve data from a cache. In some implementations, this data includes table and column information relating to the requested data, SQL information for retrieving the requested data, or other cached information. Step 410 can involve the system requesting to route the data to the intended application programming interface (API). In some implementations, step 410 involves the system fetching uncached data from the API and making it available to cache. Step 412 can involve the API endpoint invoking LLM models for query building. For example, a query generation LLM model can be invoked and fed with various inputs, such as table and column information and SQL information. At step 414, the system can execute the generated query and generate a response based on the executed query. The response can include an indication of the retrieved data requested in the natural language input. In some implementations, the response is enriched at step 416. For example, the system enriches a natural language response with terminology or vocabulary relevant to the request. In some implementations, the enrichment enhances user comprehension of the response. In some implementations, the system utilizes a relevant knowledge base at step 418 to enhance the response. The enriched response can then be output to the user.

FIG. 5 is a flow diagram that illustrates a method of the present technology. The method 500 includes receiving, at operation 502, via a user device, a request for a data item stored in a data storage location. In some implementations, the request is received in the form of a natural language input. The method 500 includes inputting into a first model, at operation 504, the request and a listing of one or more data structures within the data storage location. This can cause the first model to generate a first output identifying a data structure storing the data item within the data storage location. The method 500 includes inputting into a second model, at operation 506, the request and a data structure schema of the identified data structure. This can cause the second model to generate a second output identifying a column of the identified data structure storing the data item within the data structure. The method 500 includes inputting into a third model, at operation 508, the request and a set of SQL queries. This can cause the third model to generate a third output identifying a SQL query from the set of SQL queries. In some implementations, the set of SQL queries corresponds to the identified table within the database. The method 500 includes inputting into a query generation LLM, at operation 510, the first output, the second output, and the third output. This can cause the query generation LLM to generate a final SQL query to retrieve the data item from the data storage location. The method 500 includes executing, at operation 512, the final SQL query to cause the retrieval of the data item from the data storage location. The method 500 includes outputting to the user device, at operation 514, an indication of a retrieved data item. In some implementations, the output can be a natural language response including the indication of the retrieved data item.

Computer System

Figure 6:
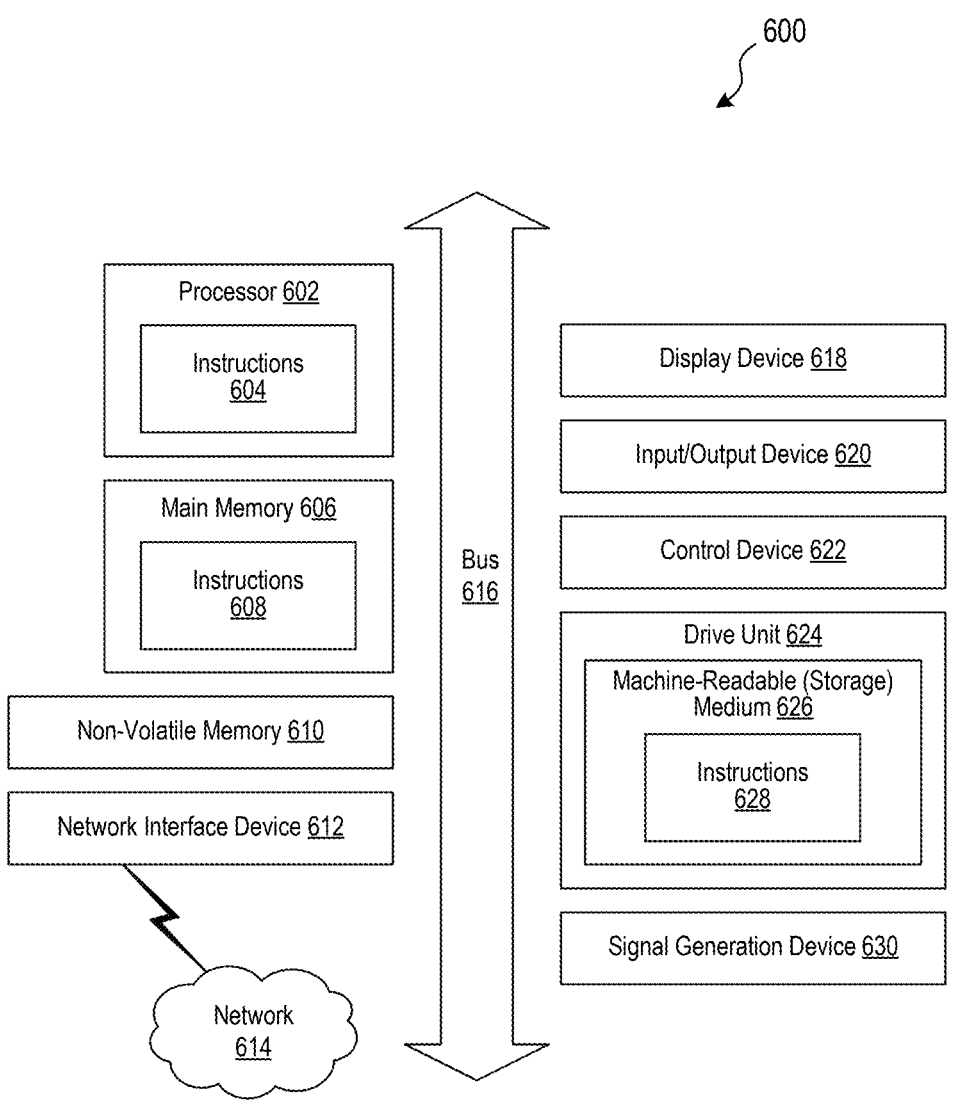
FIG. 6 is a block diagram that illustrates components of a computing device.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to:

receive, via a user device, a natural language input comprising a request for a data item stored in a database;

input, into a first retrieval-augmented generation (RAG) large language model (LLM), the natural language input and a listing of one or more tables within the database to cause the first RAG LLM to generate a first output identifying a table storing the data item within the database;

input, into a second RAG LLM, the natural language input and a table schema of the identified table to cause the second RAG LLM to generate a second output identifying a column of the identified table storing the data item within the table;

input, into a third RAG LLM, the natural language input and a set of Structured Query Language (SQL) queries to cause the third RAG LLM to generate a third output identifying a SQL query from the set of SQL queries, wherein the set of SQL queries corresponds to the identified table within the database;

input, into a query generation LLM, the first output, the second output, and the third output to cause the query generation LLM to generate a final SQL query to retrieve the data item from the database;

execute the final SQL query to cause the retrieval of the data item from the database; and output, to the user device, a natural language response comprising an indication of the retrieved data item.

2. The non-transitory, computer-readable storage medium of claim 1, wherein the set of SQL queries comprises pairs of: (i) a particular request for a particular data item within the table and (ii) a corresponding SQL query.

3. The non-transitory, computer-readable storage medium of claim 2, wherein causing the third RAG LLM to generate the third output identifying the SQL query from the set of SQL queries comprises causing the third RAG LLM to:

identify a first pair for which a first request matches the request of the natural language input; and generate the third output identifying the SQL query, wherein the SQL query corresponds to a first corresponding SQL query of the first pair.

4. The non-transitory, computer-readable storage medium of claim 1, wherein the instructions further cause the system to:

generate, using a SQL query generation model, a corresponding set of SQL queries for each table within the database for retrieval of data items from each table in the database; and convert each SQL query of each corresponding set of SQL queries into a corresponding SQL embedding.

5. The non-transitory, computer-readable storage medium of claim 4, wherein the instructions causing the third RAG LLM to generate the third output identifying the SQL query from the set of SQL queries further comprises instructions causing the third RAG LLM to:

convert the natural language input into an input embedding;

search the set of SQL queries for a SQL embedding that is most relevant to the input embedding; and identify the SQL query corresponding to the SQL embedding.

6. The non-transitory, computer-readable storage medium of claim 1, wherein two or more of the first RAG LLM, the second RAG LLM, and the third RAG LLM are a same RAG LLM.

7. A device comprising:

at least one hardware processor; and at least one non-transitory memory storing instructions, which, when executed by the at least one hardware processor, cause the device to:

receive, via a user device, a natural language input comprising a request for a data item stored in a data storage location;

input, into a first generative model, the natural language input and a listing of one or more data structures within the data storage location to cause the first generative model to generate a first output identifying a data structure storing the data item within the data storage location;

input, into a second generative model, the natural language input and a data structure schema of the identified data structure to cause the second generative model to generate a second output identifying a column of the identified data structure storing the data item within the data structure;

input, into a third generative model, the natural language input and a set of Structured Query Language (SQL) queries to cause the third generative model to generate a third output identifying a SQL query from the set of SQL queries;

input, into a query generation large language model (LLM), the first output, the second output, and the third output to cause the query generation LLM to generate a final SQL query to retrieve the data item from the data storage location;

execute the final SQL query to cause the retrieval of the data item from the data storage location; and output, to the user device, a natural language response comprising an indication of the retrieved data item.

8. The device of claim 7, wherein the set of SQL queries corresponds to the identified data structure within the data storage location.

9. The device of claim 7, wherein the set of SQL queries comprises pairs of: (i) a particular request for a particular data item within the data structure and (ii) a corresponding SQL query.

10. The device of claim 9, wherein causing the third generative model to generate the third output identifying the SQL query from the set of SQL queries comprises causing the third generative model to:

identify a first pair for which a first request matches the request of the natural language input; and generate the third output identifying the SQL query, wherein the SQL query corresponds to a first corresponding SQL query of the first pair.

11. The device of claim 7, further comprising:

generating, using a SQL query generation model, a corresponding set of SQL queries for each data structure within the data storage location for retrieval of data items from each data structure in the data storage location; and converting each SQL query of each corresponding set of SQL queries into a corresponding SQL embedding.

12. The device of claim 11, wherein causing the third generative model to generate the third output identifying the SQL query from the set of SQL queries further comprises causing the third generative model to:

convert the natural language input into an input embedding;

search the set of SQL queries for a SQL embedding that is most relevant to the input embedding; and identify the SQL query corresponding to the SQL embedding.

13. The device of claim 7, wherein causing the query generation LLM to generate the final SQL query further comprises causing the query generation LLM to generate the final SQL query based on the data structure, the column, and data structure and column information included in the SQL query.

14. A system comprising:

a communication device to:

receive, via a user device, a request for a data item stored in a data storage location; and output, to the user device, an indication of a retrieved data item; and a data-processing device to:

input, into a first model, the request and a listing of one or more data structures within the data storage location to cause the first model to generate a first output identifying a data structure storing the data item within the data storage location;

input, into a second model, the request and a data structure schema of the identified data structure to cause the second model to generate a second output identifying a column of the identified data structure storing the data item within the data structure;

input, into a third model, the request and a set of Structured Query Language (SQL) queries to cause the third model to generate a third output identifying a SQL query from the set of SQL queries, wherein the set of SQL queries corresponds to the identified data structure within the data storage location;

input, into a query generation large language model (LLM), the first output, the second output, and the third output to cause the query generation LLM to generate a final SQL query to retrieve the data item from the data storage location; and execute the final SQL query to cause the retrieval of the data item from the data storage location.

15. The system of claim 14, wherein the set of SQL queries corresponds to the identified data structure within the data storage location.

16. The system of claim 14, wherein the set of SQL queries comprises pairs of: (i) a particular request for a particular data item within the data structure and (ii) a corresponding SQL query.

17. The system of claim 16, wherein causing the third model to generate the third output identifying the SQL query from the set of SQL queries comprises causing the third model to:

identify a first pair for which a first request matches the request; and generate the third output identifying the SQL query, wherein the SQL query corresponds to a first corresponding SQL query of the first pair.

18. The system of claim 14, wherein the data-processing device is further caused to:

generate, using a SQL query generation model, a corresponding set of SQL queries for each data structure within the data storage location for retrieval of data items from each data structure in the data storage location; and convert each SQL query of each corresponding set of SQL queries into a corresponding SQL embedding.

19. The system of claim 18, wherein causing the third model to generate the third output identifying the SQL query from the set of SQL queries further comprises causing the third model to:

convert the request into an input embedding;

search the set of SQL queries for a SQL embedding that is most relevant to the input embedding; and identify the SQL query corresponding to the SQL embedding.

20. The system of claim 14, wherein causing the query generation LLM to generate the final SQL query further comprises causing the query generation LLM to generate the final SQL query based on the data structure, the column, and data structure and column information included in the SQL query.

* * * * *